United States Patent [19]

Van Dusen

[11] 3,960,283
[45] June 1, 1976

[54] SUPPORT FOR SILO UNLOADER, SILO SAFETY PLATFORM, AND SILAGE DISTRIBUTOR

[75] Inventor: Frederick E. Van Dusen, Hopkins, Minn.

[73] Assignee: Van Dusen & Co., Inc., Wayzata, Minn.

[22] Filed: Jan. 2, 1975

[21] Appl. No.: 538,171

[52] U.S. Cl............................. 214/17 CB; 182/128; 214/17 DB
[51] Int. Cl.² ...................... B65G 65/32; E04G 1/36
[58] Field of Search ................... 214/17 CB, 17 DB; 302/56, 60; 182/128

[56] References Cited
UNITED STATES PATENTS

| | | | |
|---|---|---|---|
| 1,258,402 | 3/1918 | Garner............................. | 182/128 X |
| 1,380,074 | 5/1921 | Myers................................ | 182/128 |
| 3,407,007 | 10/1968 | Fassauer..................... | 214/17 DB X |
| 3,565,268 | 2/1971 | Buschbom..................... | 214/17 CB |
| 3,837,427 | 9/1974 | Mattinson...................... | 182/178 X |

*Primary Examiner*—Robert G. Sheridan
*Attorney, Agent, or Firm*—Dugger, Johnson & Westman

[57] ABSTRACT

A support structure mounted at the top of the side walls of a tower silo including a safety platform accessible from the exterior of the silo, and extending into the interior of the silo so that operators may stand on the platform for servicing unloaders and filler devices at the top of the silo. Incorporated into the support structure is a track member which has a traveling carriage thereon adapted to provide a support for both a silo unloader and a silage filling distributor. The carriage and the distributor are connected by linkage such that when the filling distributor is to be used, the carriage moves laterally to move the center of support for the silo unloader away from the center of the silo so that the silo unloader can be raised above the top of the silo staves and positioned out of the way. During the times when the filling distributor is not being used, the distributor is moved to a retracted position, and the carriage automatically moves back to a position to center the support for the silo unloader with respect to the silo for normal operation of the unloader.

The support track and the safety platform are securely supported on the silo walls through a quintapod arrangement, comprising five distinct points of attachment to the track member and five points of support on the silo walls.

19 Claims, 7 Drawing Figures

SUPPORT FOR SILO UNLOADER, SILO SAFETY PLATFORM, AND SILAGE DISTRIBUTOR

BACKGROUND OF THE INVENTION

1. Field of the Invention.

The present invention relates to support members on the interior of silos and more particularly to a safety platform and support member that can be used for silo distributors and unloaders.

2. Prior Art.

The use of silo unloaders in upright silos has expanded greatly in recent years. Silos themselves have become larger in diameter, and greater in height, so that the unloaders necessarily also must be larger and therefore heavier. As silos get larger it also becomes more and more difficult to properly fill a silo.

To assist in uniform filling, it is known that use of a spinning disc type distributor mounted in the center of the silo greatly aids in distributing the silage in a substantially uniform density across the diameter of the silo.

Of course, as additional machinery such as distributors and unloaders are mounted to the top of the silo, installation, removal and servicing of such machinery becomes necessary. With the tall silos involved it becomes hazardous for operators to do such servicing.

In the past, silo unloaders have normally been supported on tripods which are positioned adjacent to the top of the silo as shown in U.S. Pat. No. 2,719,058 issued to Frederick E. Van Dusen.

There have been support frames at the top of silos for supporting unloaders, other than the tripod shown in U.S. Pat. No. 2,719,058. For example, a structure that enclosed a framework for supporting a silo unloader is shown in U.S. Pat. No. 3,407,007.

SUMMARY OF THE INVENTION

The present invention relates to support assemblies for the interior of upright or tower type silos adjacent the top thereof. The support members that are shown include stable support legs mounted on the top edges of the silo side walls, and a track member which provides means for mounting a support carriage for the silo unloader, as well as for a silo filler distributor. Linkages are provided for moving the silo unloader support to one side of the track and thus laterally from the center of the silo when the filler device is moved into its usable position, and returning the support for the silo unloader into the center of the silo when the distributor is moved to its stored position. The distributor for filling the silo and also the silo unloader can remain permanently installed in the silo, and it is a very simple job to convert the silo from a condition where silage can be unloaded from the silo to a condition where silage may be filled into the silo.

Additionally, the support members used, which comprise support legs attached at five distinct locations on the track member and on the top of the silo side walls, are used for securely supporting a safety platform assembly which is positioned adjacent to the filling mechanism and in a location where the unloader is accessible. The safety platform is accessible from the exterior of the silo either through a conventional silo chute, or may be made accessible from a catwalk structure or a separate ladder. The safety platform provides a secure support for an operator to work on either the silo unloader or distributor, and controls for operating the devices while the operation is observed by the operator may be located in a position where the controls may be operated from the safety platform. Railings are provided on the safety platform to ensure that the operator does not accidentally fall.

In the form shown, two safety platforms are actually disclosed, one of which directly aligns with the silage discharge chute. Another platform is laterally offset from the silage chute and is closely adjacent the first platform. The first safety platform aligned with the silage chute is foldable so that it can be moved out of position when not in use and the gooseneck used with a silo unloader can then be positioned to discharge into the silage chute when the silo is full.

The support and track member, as well as the safety platforms are left installed on the upper edges of the silo side walls, and the task of converting the silo from filling to unloading conditions is greatly simplified. The silo unloader does not have to be removed nor stored in a special manner during filling, but merely can be lifted up to the top of the silo, because the support point for the silo unloader will be offset sufficiently to permit the filler distributor to operate.

Therefore it is an object of the present invention to provide safety during filling and unloading operations while providing efficient use of the silos storage capacity. Further it is an object to provide for ease and convenience of operation and servicing of the silo equipment while also insuring minimal time requirements for changing from unloading to center distributor filling and back to unloading.

BRIEF DESCRIPTION OF THE DRAWINGS

FIG. 1 is a top plan view of a silo having a support mechanism and safety platform made according to the present invention installed thereon and with the roof of the silo removed;

DESCRIPTION OF THE PREFERRED EMBODIMENT

Figure 2:
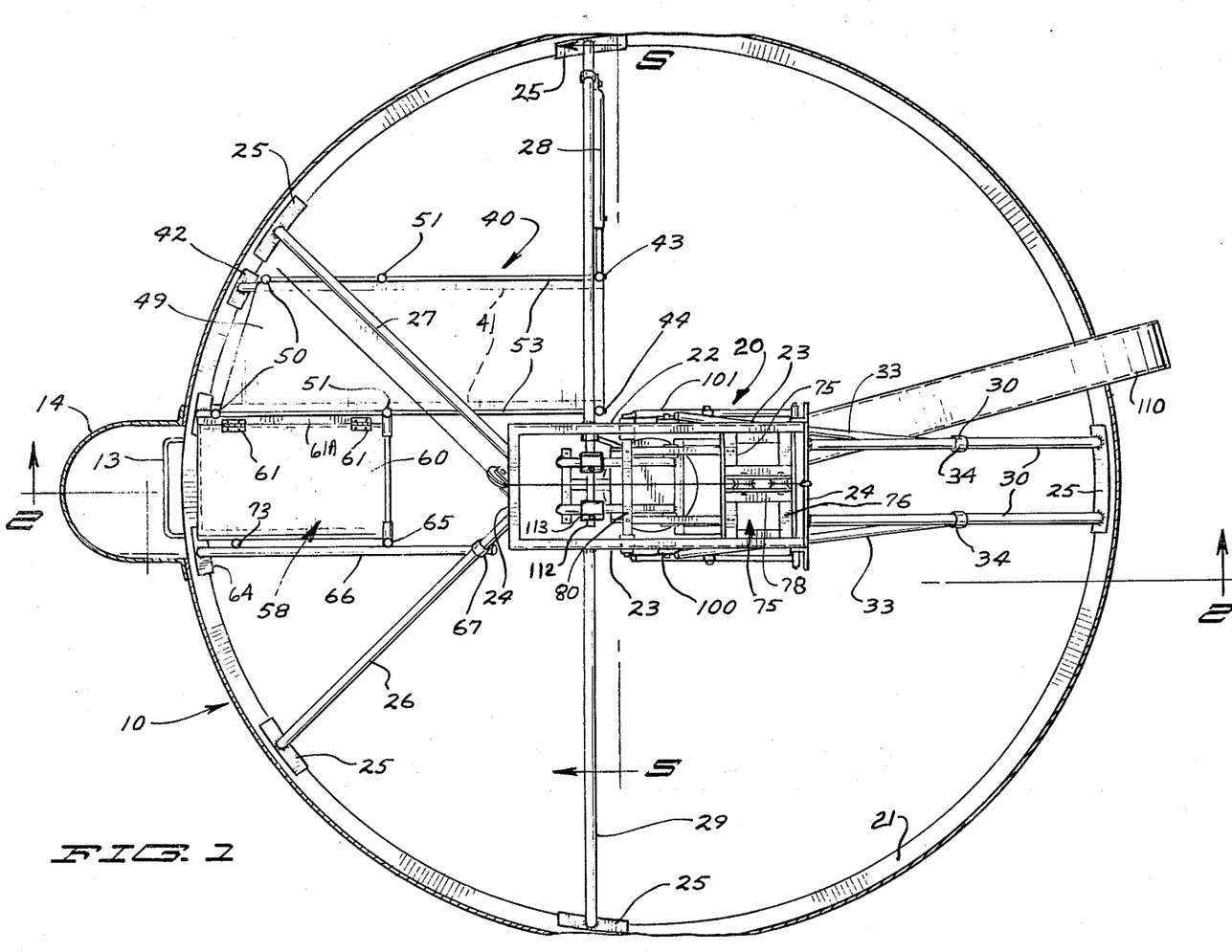
FIG. 2 is a sectional view taken substantially along line 2—2 of FIG. 1.

Referring first generally to FIGS. 1 and 2, a silo 10 is shown fragmentarily and is of usual design having upright vertical walls made of concrete staves, or other desired material. Upright or tower type silos have been getting larger, and silos in the range of 20 to 24 feet in diameter and 60 to 70 feet high are common. With such large structures, it becomes increasingly important to ensure the safety of operators, and the ease of operation of the equipment used in the silo.

The silo 10 has a plurality of vertically aligned openings 11 defined in one side thereof, and spaced apart by crossbars 12. The openings are used for discharge of silage and have removable doors that retain the silage when the silo is filled. A suitable ladder formed of rungs 13 may be provided for an operator to climb up to the top of the silo. In addition, a silage discharge chute 14 is provided adjacent the openings 11, in a conventional manner. The apparatus defined herein is not limited to this particular design of discharge chute, but can be used with other types of chutes as well. Also, as will be more fully explained, the silo may have a separate access ladder or lift apart from the chute 14 which is used for discharge of silage from the silo.

The silo can have a roof structure or dome, indicated generally at 15 and such roofs of course are also well known in the art. Usually the roof structures are made of metal. A suitable dormer 16 is provided which joins the roof structure and the chute 14 to provide access to the interior of the silo through an opening shown in FIGS. 5 and 6.

If separate operator access openings are provided to the interior of the silo, dormers would also be used to overly or cover any additional access chutes.

A support assembly, indicated generally at 20, is supported on the upper edge surface 21 of the silo side walls. As shown, a center track member 22 is supported over the center portions of the silo adjacent the upper part of the roof or dome, and this track, which is rectangular in plan view as shown in FIG. 1, has a pair of longitudinally extending side rail members, 23,23 and a pair of end members 24,24 joining the side rail members. In order to provide adequate support for the track and the mechanism which it in turn supports, the support member forms a "quintapod" which basically provides five distinct points of support. As shown, at five locations of the silo top edge 21 there are support pads 25 supported on the upper edge surfaces of the silo side wall. These pads 25 are of angle iron form as shown and include one leg that rests on the top edge 21 of the silo and another leg that is on the inside of the silo. It will be noted that the pad 25 opposite from silo opening 11 is somewhat longer than the others, and is used with a double support leg for extra strength.

As shown, there are two separate support legs 26 and 27 which are attached to one end member 24 and to pads 25 on opposite sides of the openings 11 in the side wall of the silo and which are positioned at equal angles with respect to the longitudinal bisecting plane of the track 22. Likewise, there are a pair of individual legs 28 and 29 fixed to the side rails 23 spaced from legs 26 and 27 but also adjacent the end of the track assembly 22 closest to the opening 11. The legs 28 and 29 are close to and parallel to one diametral plane of the silo.

At the opposite end of the track 22 from the openings 11 of the silo, the longer pad 25 that rests on the side wall of the silo supports a pair of legs 30, which together form a rigid support, and the upper ends of these legs 30 are fixedly attached to the adjacent end member 24 of the track assembly 22. Braces 33, 33 extend from adjustable bands 34, 34 on the respective legs 30 and the braces are fixedly attached with suitable bolts to the respective side rails 23, 23 for rigidity and strength.

The support assembly 20 is thus sturdily supported at the top of the silo and the track assembly is made of suitable members to provide adequate strength for supporting the necessary devices as will be explained. The support legs are spaced as shown in FIG. 1 to provide adequate opening between the support legs at the side of the support opposite from the silo doors or openings 11 to permit placement of gooseneck pipes from silage blowers in a wide variety of positions for filling the silo.

The support assembly 20 is used for supporting safety platforms for operators so that the operators may be permitted to stand near the center portions of the silo at the top thereof for servicing mechanical unloaders or fillers or for observing the filling or unloading operations if desired. In the arrangement disclosed, a main safety platform assembly indicated generally at 40 has a pair of longitudinally extending frame members 41,41 which are spaced apart, and have first ends supported on support pads 42,42 on the top edge 21 of the silo 10. The frame members 41,41 extend inwardly toward the center of the silo (as shown in FIG. 1 they are supported adjacent to one side of the openings 11) and the frame members 41 are each connected to a vertical support member 43 and 44, respectively at their inner ends. The support member 43 is attached as at 45 to the support leg 28, which is part of the support assembly 20, and the support member 44 is attached as at 46 to that same leg 28. Thus, the frame members 41,41 are very securely supported with respect to the silo. In addition, a cross member 47 is attached to the lower end of the upright support 43, and with a suitable clamp 48 to the leg 28 adjacent to the support pad 25 for that leg.

At the ends of the frame members 41,41, adjacent to the side wall of the silo, there are upright supports 50, and also there are intermediate upright supports 51 attached to these frame members 41. The upright supports of the safety platform in turn have horizontal members 53 attached thereon which are spaced in a vertical direction to form a safety guard rail along the sides of the platform. The frame members 41 have a solid, one piece platform 49 fixedly mounted thereon in a suitable manner for an operator's stand or platform. At the inner end of the safety platform there are cross members 54, which extend between the upright supports 43 and 44 to provide a safety guard rail as well. The height of the guard rails shall be set according to appropriate safety standards. The platform assembly 40 extends in almost halfway across the silo and such platform preferably extends at least one third of the way across the silo.

In some silo constructions, the only safety platform that is needed is the platform and safety rail structure just described. As can be seen, this platform 40 extends to near the center of the silo and an operator standing within the guard rails is very close to any structure supported by the track 22, which will be subsequently explained. If a separate access to this safety platform 40 is provided, this is all that would be needed. For example a separate outside ladder or suitable other means of access to this safety platform 40 may be provided.

Figure 5:
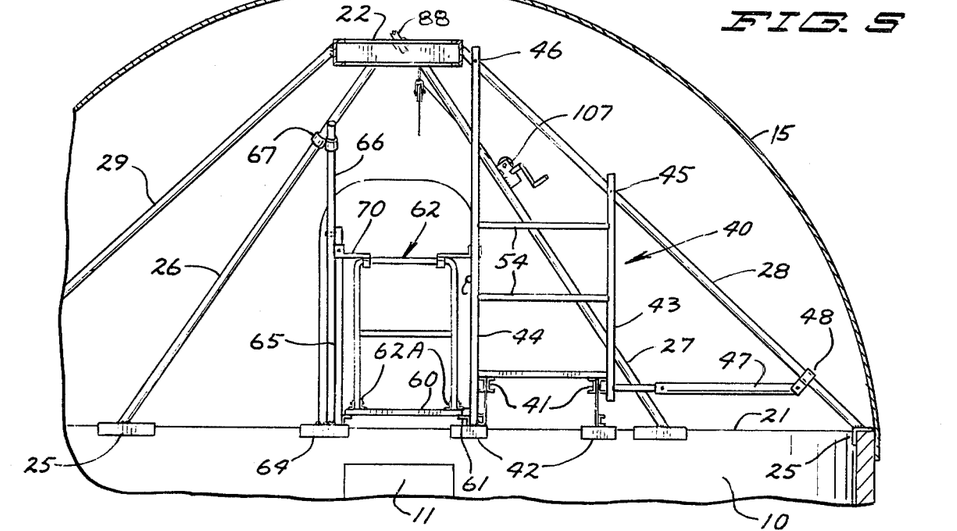
FIG. 5 is a sectional view taken along line 5—5 in FIG. 1.
Figure 6:
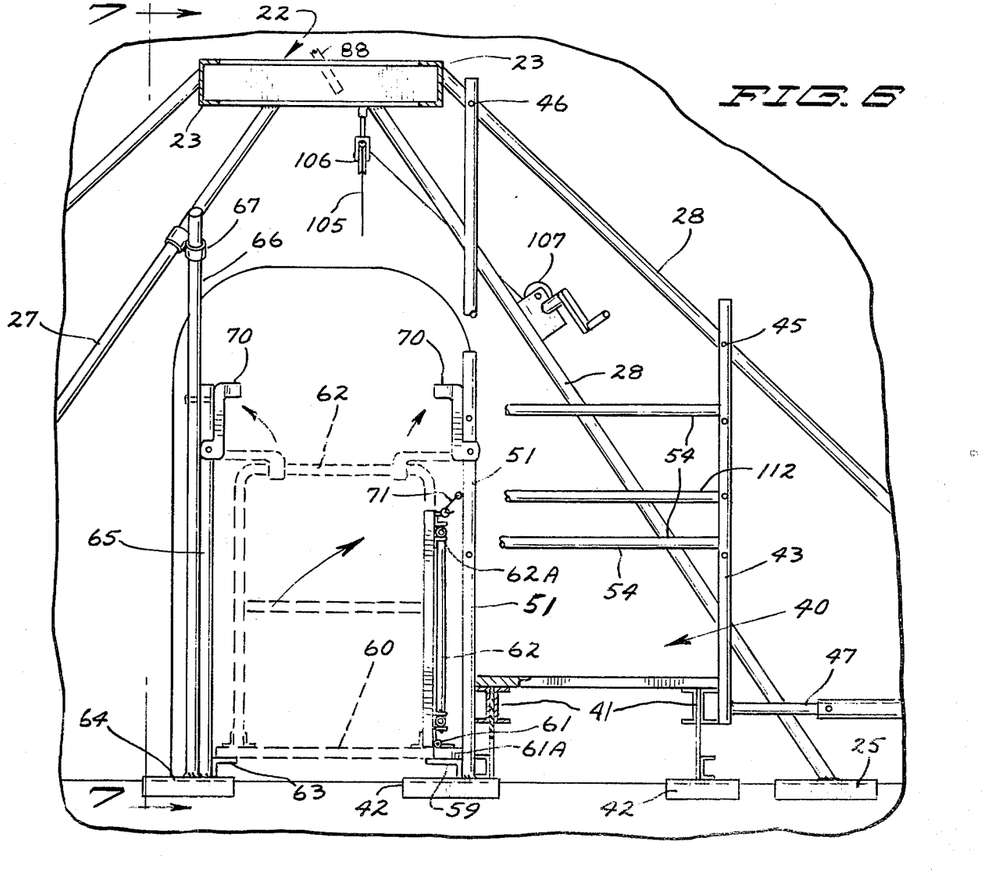
FIG. 6 is a fragmentary enlarged view of a safety platform portion taken substantially along the same line as FIG. 5.

The ladder formed by rungs 13 provides access to the interior of the silo in the form of the invention shown. Therefore, some means of safely moving from the ladder 13 to the main safety platform 40 is necessary. There is an auxiliary safety platform assembly illustrated generally at 58 which is directly aligned with the openings 11 and the rungs 13 and is accessible through the opening defined in the roof by the dormer 16. As shown this platform 58 is made to be folded out of the way to permit a gooseneck chute from a silo unloader to be placed through the upper one of the openings 11 for discharging silage from the silo. As shown, the auxiliary platform 58 includes a first support frame member 59 that is attached at a first end thereof to one of the support pads 42 for the platform assembly 40, and as shown the outer end of member 59 is attached to one of the upright members 51, which is fixed to one support 41 and forms a part of the safety platform 40. A platform 60 is hinged with hinges 61 to a longitudinally extending strip 61A that is fixed to one leg of frame member 59. The platform 60 will fold upwardly along its longitudinal edge from the horizontal position as shown in FIG. 5 to the vertical position as shown in FIG. 6. It should be noted that the horizontal leg of frame member 59 extends beyond the edge of strip 61A so that when the platform 60 is folded down it is positively supported directly on the edge of the frame member 59 for safety. The opposite edge of the platform 60 is supported directly on a frame member 63 that is fixed at one end to a support pad 64 supported on the silo wall. The frame member 63 extends toward the center of the silo and its second end is supported on an upright member 65 which is attached to a brace 66 that in turn is attached to the pad 64 and with a clamp 67 to the leg 26 as shown in FIGS. 1, 5 and 6. The longitudinal frame member 63 thus remains fixed in place, and as shown has a horizontal leg that is positioned to directly support the edge of the platform 60 opposite from the hinge 61.

A safety railing gate 62 is pivotally mounted as at 62A about a horizontal axis to the platform 60, so that it will fold from a vertical position as shown in FIG. 5 to a position where it is horizontal or flat along the platform 60 as shown in FIG. 6. The gate member 62 is held in its upright position through a pair of pivoted latches 70,70 that are pivoted to upright member 65 and to the member 51, which is on the side of platform assembly 40 adjacent to platform assembly 58. These latches are shown in solid lines in FIG. 5, and can be raised (pivoted) to the solid line position as shown in FIG. 6 to release the gate or assembly 62 and permit it to be pivoted flat along the platform 60. Then the platform 60 can be pivoted on its hinges 61 to a vertical position as shown in FIG. 6, and held with a suitable hook and eye arrangement indicated generally at 71 or other suitable latch. In this way the auxiliary platform assembly is folded out of the way so that a gooseneck from a silo unloader can be placed into the uppermost opening 11 in the silo wall for discharge of silage. The safety gate 62 provides a safety end member for the safety platform.

Safety side rails 72 extend from upright member 65 to another upright member 73 that is fixed to frame member 63 along the outer side of platform 58.

It can thus be seen that a person coming up the ladder 13 can stand on the platform 58 when it is in its lowered position and go over to the main platform 40. The side rails between the two platforms can be reduced in height for ease of access to platform 40 if desired.

The support assembly 20 has a primary function of permitting the quick conversion from use of a distributor type silo filler to use of a silo unloader in the silo. Distributors for filling silos are highly desirable because they eliminate pressure cones within the silo, and permit uniform density filling and complete filling. Such distributor type fillers are quite well known, but now require a great deal of effort in placement and removal, and any silo unloader in the silo has to be moved out of the way in some manner during filling. The present device makes conversion from filling to unloading and vice versa extremely simple through the use of a traveling carriage at the top of the silo. As shown, the FIGS. 4 and 5, the side rails 23,23 of the track 22 are channel shaped having inwardly facing top and bottom legs, which form guide members for a traveling carriage 75 positioned between these side members or rails 23,23. The carriage 75 is an open framework member having a pair of cross pieces 76 and 77 that rest on the inner surface of the lower legs of the rails 23 and a pair of support members 78 joining these cross members. Suitable members 79,79 are also attached to cross member 76 on the bottom side thereof and extend in direction toward opening 11 from the cross member 76. A cross member 80 connects the side members 79,79, and extends laterally therefrom. A pair of depending ears 80A and 80B are connected to member 80 and carry a cross shaft 81 that is positioned on the under side of the track 22. Suitable support tabs 82 are fastened to the top of cross member 80 and slidably rest on the upper side of the lower legs of the side rails 23 to support the member 80 and the shaft 81 on the track. Cross members 76 and 77 are angle iron members and have one leg that slidably rests directly on the inner surfaces of the lower legs of the side rails 23,23. Thus, the carriage assembly is slidably mounted for movement along the length of the rails 23,23.

Figure 3:
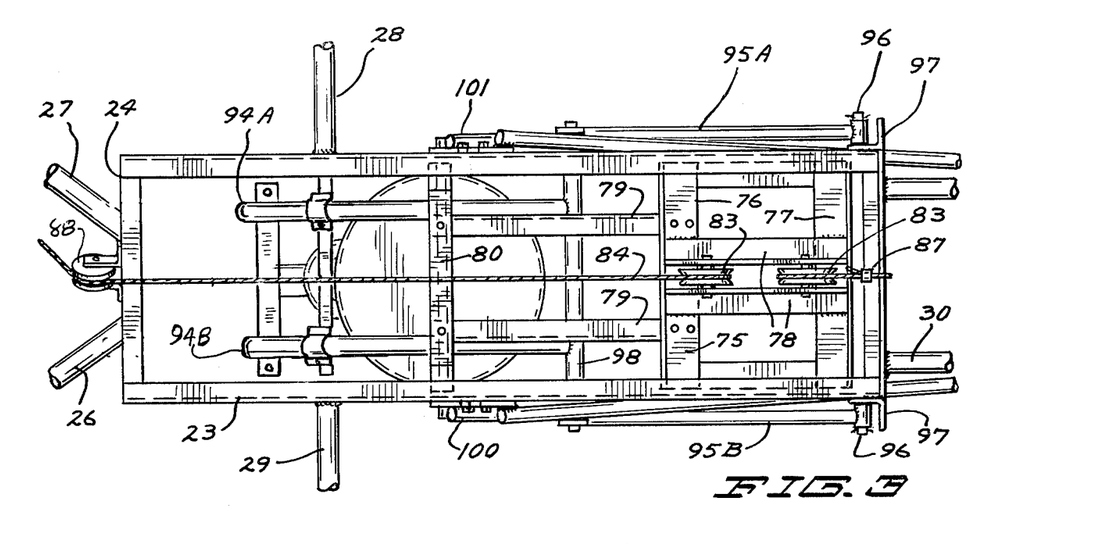
FIG. 3 is a fragmentary top plan view taken generally along line 3—3 in FIG. 2.
Figure 4:
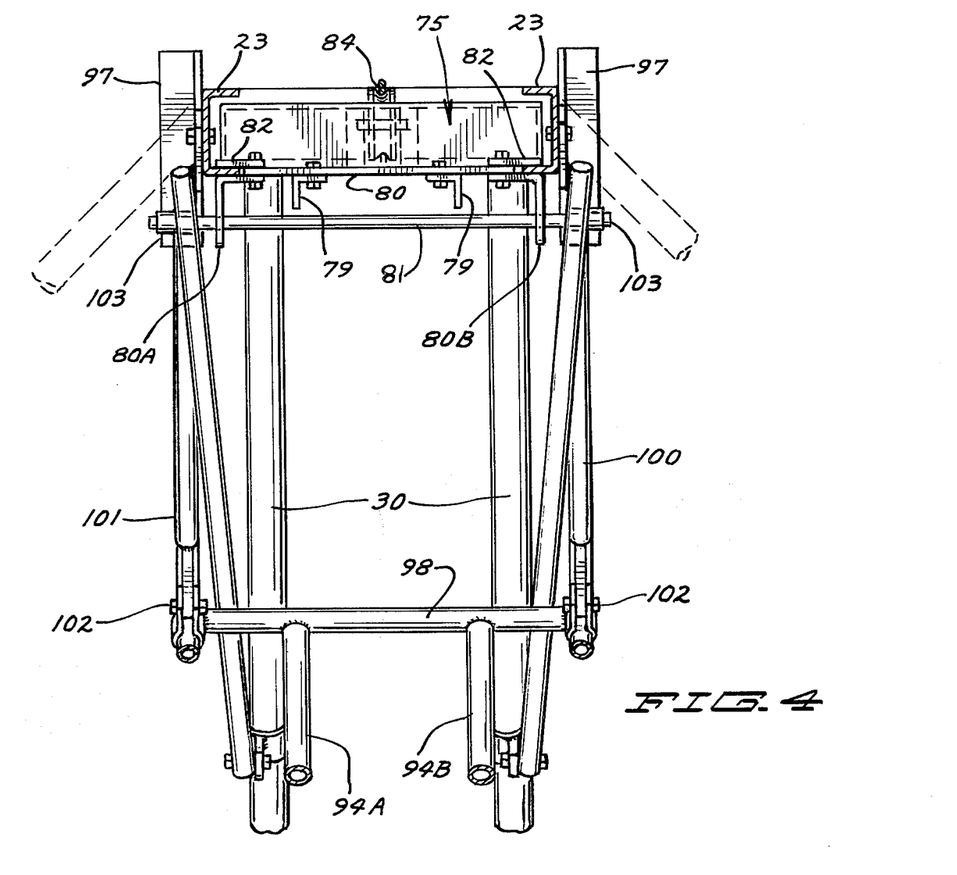
FIG. 4 is a sectional view taken generally along line 4—4 in FIG. 2.
Figure 7:
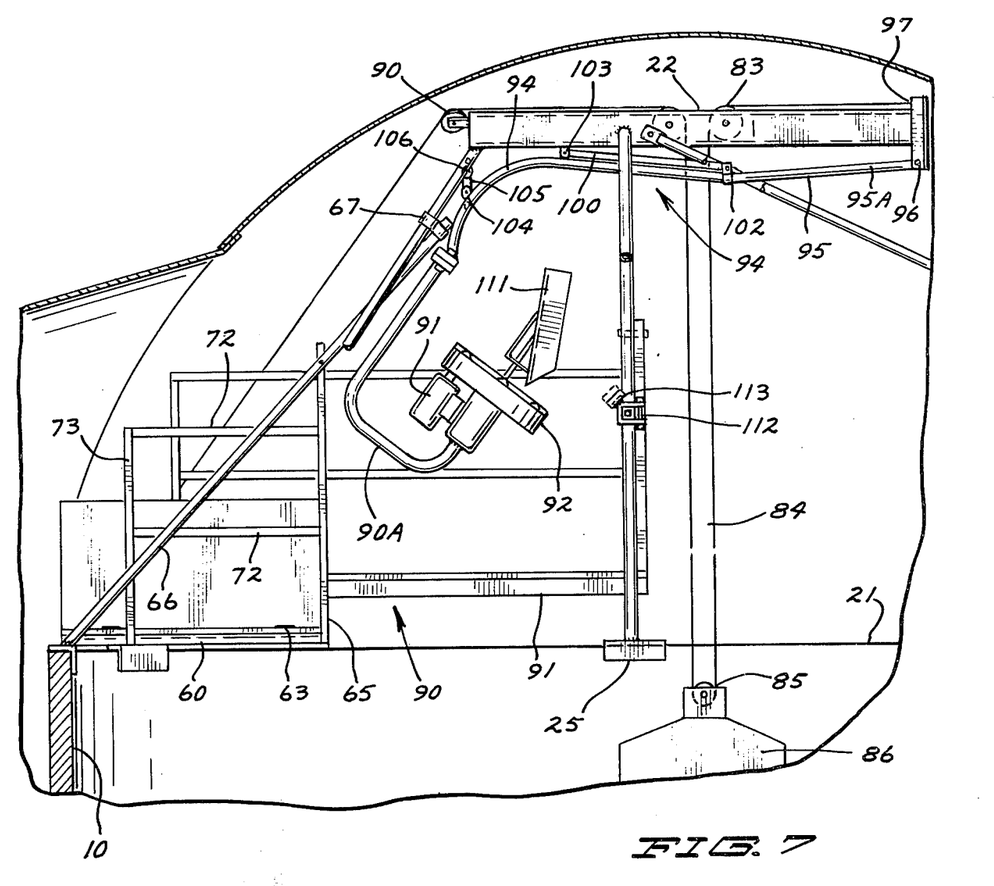
FIG. 7 is a sectional view taken as on line 7—7 in FIG. 6.

The carriage 75 is used for supporting not only the silo unloader, but also a filling distributor assembly. As shown in FIGS. 3, 4 and 7, the members 78 have a pair of pulleys 83,83, rotatably mounted thereon. A cable 84 that leads to a silo unloader raising and lowering winch (not shown) is passed over the first pulley 83, and is looped down to extend over a pulley 85, which is mounted onto a silo unloader 86. The silo unloader is indicated only as a box, because it can be any desired type of unloader that operates on the interior of the silo. The cable 84 is then passed up over the second of the pulleys 83, and is dead ended (fastened) as at 87 to the track, in a suitable manner. Suitable guide pulleys 88, for example, can be provided for guiding the cable 84 as it travels downwardly to the unloader hoist that is generally mounted at the base of the silo.

A silage distributor assembly, indicated generally at 90, comprises a variable speed electric motor 91, which has suitable drives to drive a spinning or rotating distributor disc illustrated schematically at 92. The distributor similarly is a conventional unit that is available on the market from Even-Flo Silage Distributor, Inc. of Lafayette, Indiana. Such distributors are shown in U.S. Pat. No. 3,337,065, issued to Andrew Freeman. The support arm 90A for the distributor attaches to a support frame assembly 93. The frame assembly 93 includes a first portion 94 and a second portion 95 fixedly joined together. The second portion 95 is pivotally mounted as at 96 to a pair of members 97 fixed to the track 22 at one end thereof. The pivotal axis for the support frame 93 is horizontal. The frame portion 95 comprises a pair of members 95A and 95B positioned on opposite sides of the track 22. The frame members 95A and 95B are connected together with a rigid cross member 98, and the first frame portion 94 comprises a pair of curved pipes 94A and 94B which are fixed to cross member 98 and are positioned underneath the track. The pipes 94A and 94B are closer together than the members 95A and 95B.

A pair of control links 100 and 101, respectively, have first ends pivotally mounted as at 102 to brackets fixed to the frame 93, and second ends pivotally mounted as at 103 to the shaft 81.

A pulley 104 is provided on the frame portion 94, as shown, and a rope 105 extends over a pulley 106 that is attached to the support track 22 thence over pulley 104 and is dead ended back at the pulley 106. The rope 105 extends downwardly to a hand winch indicated at 107, so that the frame 93 can be raised and lowered through the operation of the winch. The winch 107 is attached to the support leg 27, and is easily accessible, therefore, from the safety platform assembly 40. When the winch 107 is operated to release rope from the winch, and with the cable 84 for the silo unloader slack, the frame assembly 93 will lower under the force of gravity on the distributor assembly. This will cause the links 100 and 101 to pull on the carriage 75, and move it from its position shown in FIG. 7 to its position shown in FIG. 3 so that the carriage is at the far end of the track, that is, at the end opposite from the openings 11 on the safety platform. This will in turn move the silo unloader support pulleys 83,83 away from the center of the silo, and the silo unloader support will be off to the side. The distributor 90, however, will move to its usable position for filling the silo as shown in FIG. 2.

The silo unloader can be then raised (after it is folded up as is conventionally done) to a position shown only schematically in FIG. 2. This raises the unloader up out of the way of the silage as the silo is filled. A suitable blower can be used for transferring silage up through a gooseneck assembly 110, which drops silage onto an adjustable deflector 111 which in turn guides silage onto the spinning disc for distribution in the silo.

When the silo is filled, the silo unloader is lowered until it rests on the silage in the silo and the cable 84 is again made slack.

The winch 107 can then again be operated to raise the frame 93 and the distributor assembly 90, and at the same time the links 100 and 101 will push on the shaft 81 and move the carriage assembly 75 to its position shown in FIG. 7 wherein the pulleys 83,83 are centered relative to the center of the silo. The hoist cable for the silo unloader will be in the center so that the silo unloader then will be in its usable position in the center of the silo. The carriage will slide along the rails 23, and if desired, low friction material may be used for supporting the carriage relative to the rails. It can also be seen that if problems develop with the distributor, raising the distributor to its non-use position, as in FIG. 7, will permit an operator standing on the safety platform 40 or platform 58 to work on the distributor assembly.

For rigidity during use of the distributor, a cross member 112 is attached to the upright members 43 and 44 of platform 40 and extends therebetween, and extends laterally from the upright members. Cross member 112 is used to support the frame 93. The cross member 112 has a pair of releasable clamps 113 which are used to clamp the pipes 94A and 94B of frame portion 94 solidly with respect to the cross member 112 when the distributor assembly 90 is in its usable position as shown in FIG. 2. A very rigid support for the distributor assembly is thus made. The clamps and cross member tie the entire frame 93 back into the quintapod structure, and in particular, into the leg 28 for rigidity.

In addition, an adjustable strap bracket 115 is adjustably mounted onto the cross member 112 and is also attached as at 116 to the outer end of the gooseneck 110 so it can be adjusted precisely with respect to the deflector 111, and also rigidly supported so that the gooseneck does not vibrate excessively during the filling operation.

The silo unloader stores safely out of the way, in a very convenient manner, during the filling operation.

Controls for the hoist for raising and lowering the unloader may be mounted on the guard rails for the safety platform 40. Also, a power receptacle for powering motor 91 of the distributor and controls for controlling the speed thereof may be provided on the safety platform 40 or 58 for ease of control of the powered components.

It is important to note that the gooseneck 110 has a high, curved center part so that the unloader can be raised above the level of the path of material (silage) that is distributed by the distributor. Generally this means the bottom of the unloader will be above the distributor disc. While the silo unloader is shown schematically in the drawings, the unloader will actually nest under the curved portion of the filler pipe 110 and will be at a height sufficient to clear the filling and distributing means.

What is claimed is:

1. In combination for a silo having generally upright side walls, a support for a silo unloader mounted fixedly to the top of said silo walls including a plurality of support legs, means to fixedly join said legs to each other at a location generally overlying the center portions of said silo, said legs extending outwardly and downwardly from said means to fixedly join and being nonmovably supported to the upper edges of said silo walls, means to support a silo unloader mounted to said means to fixedly join, a nonmovable operator's platform mounted adjacent the upper edges of said silo comprising first support means fixedly supported to the upper edges of the side walls of the silo, and comprising members extending generally horizontally into the interior of said silo area below the level of said means to join said legs and offset from the center of the silo sufficiently to permit a silo unloader to be supported from said legs to operate in the silo, a platform attached to said first support means and being of size to accommodate and support a person thereon, and second support means for the interior end portions of said horizontal members comprising generally vertically extending support members fixedly attached to at least some of said legs.

2. The combination as specified in claim 1, and a safety guard rail mounted onto said horizontally extending support means and extending upwardly from said platform.

3. The combination of claim 1 wherein said horizontally extending support members extend inwardly from the silo wall for a distance equal to at least one-third of the maximum transverse dimension of the silo.

4. Apparatus for supporting a silo unloader adjacent the top of a silo having an upright silo wall defining an enclosure with an upright central axis, including a plurality of support legs mounted to the upper edges of said silo wall, a track member, means to connect said legs to said track member at a position raised above the upper edges of said silo wall and adjacent the central upright axis, a carriage movably mounted on said track member, said track member providing a path of movement of said carriage generally perpendicular to said upright central axis of said silo, means on said carriage for supporting a silo unloader thereon, and an operating linkage for moving said carrige along said track member from a first position wherein said means for supporting a silo unloader is substantially centered with respect to the upright central axis of the silo, and to a second position wherein said means for supporting a silo is offset from the center of the silo a sufficient amount so that a silo unloader supported by said means to support a silo unloader generally is clear of the upright central axis of said silo.

5. The combination as specified in claim 4 and a distributor assembly for distributing silage including a disc member rotatable under power about a substantially upright axis when in working position, a frame pivotally mounted on said track and supporting said disc member, said operating linkage including linkage means between said frame and said carriage, said linkage means moving said carriage to its centered position when the frame is pivoted to position with the distributor in a first operative position, and moving said carriage to a second laterally displaced position when the frame is in a second position with the distributor laterally displaced from the center portions of said silo.

6. The combination of claim 5 wherein said frame is of length and configuration to move the distributor above the level of the silo walls with the frame in its second position.

7. The combination as specified in claim 5 wherein said side wall of said silo has a plurality of discharge openings and wherein said first support means includes a pair of spaced second horizontal support members supported at the upper edges of said silo and extending inwardly from the side wall adjacent to said first mentioned platform, means to support said second horizontal support members with respect to said first support means, and a second platform member hingedly mounted adjacent one longitudinal edge of one of said second horizontal support members, said second platform member being pivotable from a generally horizontal position to a substantially vertical position.

8. The combination as specified in claim 7 and a safety gate pivotally mounted on said second platform member, said safety gate being pivotally mounted to the second platform member adjacent the end of the second platform member spaced from the side wall of the silo and about an axis substantially parallel to the plane of said second platform member whereby said safety gate can be pivoted from a position extending at generally right angles with respect to said second platform member, to a position generally parallel to said second platform member.

9. A support assembly for placement on the upper edges of an upright silo having a side wall forming an enclosure having a generally upright central axis, said assembly including a track member, a plurality of legs having first ends fixed to said track member and extending downwardly and outwardly therefrom and means at second ends of said legs adapted to support said legs with respect to the upper edges of the side wall of a silo with the track member positioned above the side wall of said silo, a carriage mounted in said track member, means on said carriage to support a silo unloader, said carriage being movable along said track member when mounted in said silo from a first carriage position wherein said means to support a silo unloader is substantially centered with respect to the upright central axis of said silo in which the track member is mounted to a second carriage position wherein said means to support a silo unloader is laterally displaced and spaced from the center portions of said silo in which the track member is mounted a different distance than when in said first carriage position, said track member being mounted to permit movement in a plane generally perpendicular to said upright central axis.

10. The combination as specified in claim 9 and a support frame pivotally mounted with respect to said track member, linkage means extending between said support frame and said carriage, said linkage means causing movement of said carriage when said support frame is pivoted with respect to its pivotal axis, and means to control pivoting of said support frame to move said carriage between its first and second positions as said support frame is moved from a first frame position to a second frame position.

11. The combination as specified in claim 10 and a silage filler distributor attached to said support frame, said filler distributor including a spinning member for receiving and distributing silage when said frame is in a first frame position, and said distributor being moved by said support frame to position generally above the level of the upper edges of the walls of a silo on which the legs are mounted and laterally offset from the center of such a silo when said frame is in said second frame position.

12. The combination as specified in claim 9 wherein said track member includes a pair of substantially parallel spaced apart side rail members, said carriage being supported on said side rail members.

13. The combination as specified in claim 9 and a safety platform assembly including horizontal support means having first ends thereof adapted to be supported on the upper edges of a silo walls, and means to attach second ends thereof to at least one of said legs, said horizontal support means extending inwardly from the edges of a silo wall to the region adjacent the center portions of a silo on which the support assembly is mounted.

14. The combination of claim 13 wherein said means to attach second ends thereof to said one leg comprises a pair of vertically extending frame members fixed to said one leg and to said horizontal support means, and a horizontal brace extending from the same leg and engaging said horizontal support means.

15. The combination of claim 9 and means mountable in the center portion of a silo in which the support assembly is placed to permit filling the silo, said carriage moving a sufficient distance laterally from the first to the second position so that the means to support a silo unloader is clear of the means to permit filling the silo.

16. The combination as specified in claim 9 and a filler pipe formed in a curved shape to thereby have a curved portion and being supported with one end of the curved portion adjacent the center portions of a silo on which the support assembly is mounted with the curved portion extending upwardly and laterally from said one end, said means to support a silo unloader moving laterally to position at a level below the curved shape when the carriage is in said second carriage carriage position whereby a silo unloader carried by said means to support may be raised into the area defined by and below said curved portion.

17. The combination of claim 16 and means to support a silage distributor on said support member when the carriage is in the second carriage position, a silo unloader carried by said means to support being raisable above the path of silage distributed by a silage distributor supported on said means to support.

18. The combination of claim 9 wherein said silo has a vertical row of discharge doors and said track is positioned to permit movement of said carriage along a line generally normal to the plane of said discharge doors.

19. The combination of claim 18 wherein said track comprises a generally rectilinear track frame, said legs including at least one separate leg position on each of the sides of said track frame other than the side adjacent to said discharge doors, and at least two legs fixed to the side of said track frame adjacent said discharge doors, the ends of said last mentioned two legs being spaced apart and mounted to the silo wall on opposite sides of said discharge doors.

* * * * *